US012779805B2

(12) United States Patent
Maccagnan et al.

(10) Patent No.: US 12,779,805 B2
(45) Date of Patent: Nov. 3, 2026

(54) METHOD FOR PRODUCING OBJECTS

(71) Applicant: GIMAC INTERNATIONAL S.R.L., Castronno (IT)

(72) Inventors: Simone Maccagnan, Castronno (IT); Pierpaolo Rutticco, Albosaggia (IT)

(73) Assignee: GIMAC INTERNATIONAL S.R.L., Castronno (IT)

( * ) Notice: Subject to any disclaimer, the term of this patent is extended or adjusted under 35 U.S.C. 154(b) by 149 days.

(21) Appl. No.: 18/558,055

(22) PCT Filed: May 3, 2022

(86) PCT No.: PCT/IB2022/054058
§ 371 (c)(1),
(2) Date: Oct. 30, 2023

(87) PCT Pub. No.: WO2022/234441
PCT Pub. Date: Nov. 10, 2022

(65) Prior Publication Data

US 2024/0227339 A1 Jul. 11, 2024

(30) Foreign Application Priority Data

May 7, 2021 (IT) ........................ 102021000011732

(51) Int. Cl.
*B29D 99/00* (2010.01)
*B23B 35/00* (2006.01)
(Continued)

(52) U.S. Cl.
CPC .......... *B29D 99/0089* (2013.01); *B23B 35/00* (2013.01); *B23C 3/13* (2013.01);
(Continued)

(58) Field of Classification Search
CPC ........ B29D 99/089; B29D 7/00; B33Y 40/10; B33Y 10/00; B23C 3/13; E04C 2/365
See application file for complete search history.

(56) References Cited

U.S. PATENT DOCUMENTS

2007/0199643 A1* 8/2007 Kawai .................. B28B 11/007 156/89.22
2015/0298423 A1 10/2015 Holemans
(Continued)

FOREIGN PATENT DOCUMENTS

EP 2875946 A1 5/2015
JP 9131788 A 4/1988
(Continued)

OTHER PUBLICATIONS

International Search Report and Written Opinion dated Jul. 4, 2022 from counterpart PCT App No. PCT/IB2022/054058.
(Continued)

*Primary Examiner* — Nahida Sultana
(74) *Attorney, Agent, or Firm* — SHUTTLEWORTH & INGERSOLL, PLC; Timothy J. Klima

(57) ABSTRACT

A method for the production of objects including at least one honeycomb panel is performed by setting up a honeycomb panel and engraving it in such a way as to create a deposition path with a predetermined depth. A filler material is applied along the deposition path so as to fill it at least partially.

17 Claims, 8 Drawing Sheets

(51) Int. Cl.

| | |
|---|---|
| ***B23C 3/13*** | (2006.01) |
| ***B29D 7/00*** | (2006.01) |
| ***B33Y 10/00*** | (2015.01) |
| ***B33Y 40/10*** | (2020.01) |
| ***E04C 2/36*** | (2006.01) |

(52) U.S. Cl.
CPC ................ *B29D 7/00* (2013.01); *B33Y 40/10* (2020.01); *E04C 2/365* (2013.01); *B33Y 10/00* (2014.12)

(56) References Cited

U.S. PATENT DOCUMENTS

| | | | | |
|---|---|---|---|---|
| 2018/0001571 | A1 | 1/2018 | Lennon | |
| 2020/0023606 | A1 * | 1/2020 | Sekine | B29D 24/005 |
| 2020/0298442 | A1 * | 9/2020 | Jochum | B28B 3/2672 |
| 2022/0023606 | A1 * | 1/2022 | Renlund | A61B 5/150022 |
| 2022/0126480 | A1 * | 4/2022 | Wang | B22F 10/85 |
| 2023/0043070 | A1 * | 2/2023 | Fukuda | D04H 1/4382 |

FOREIGN PATENT DOCUMENTS

| | | | | |
|---|---|---|---|---|
| JP | 3032028 | B | 3/1991 | |
| JP | 04290736 | A * | 10/1992 | B29C 39/10 |
| JP | H04290736 | A | 10/1992 | |
| JP | H0661146 | U | 8/1994 | |
| JP | 3032028 | B2 | 4/2000 | |
| JP | 2006305750 | A | 11/2006 | |
| JP | 2016001053 | A | 1/2016 | |
| WO | 2005045263 | A1 | 5/2005 | |

OTHER PUBLICATIONS

Japanese search reported dated Jan. 15, 2026 from application No. 2023-568534.
Chinese 1st Office Action dated Jul. 19, 2025 from counterpart Chinese App No. 2023-568534.
Chinese 2nd Office Action dated Jan. 24, 2026 from counterpart Chinese App No. 2023-568534.
Chinese 3rd Office Action dated May 10, 2026 from counterpart Chinese App No. 2023-568534.
Japanese Notice of Reason for Refusal dated Jan. 16, 2026.

* cited by examiner

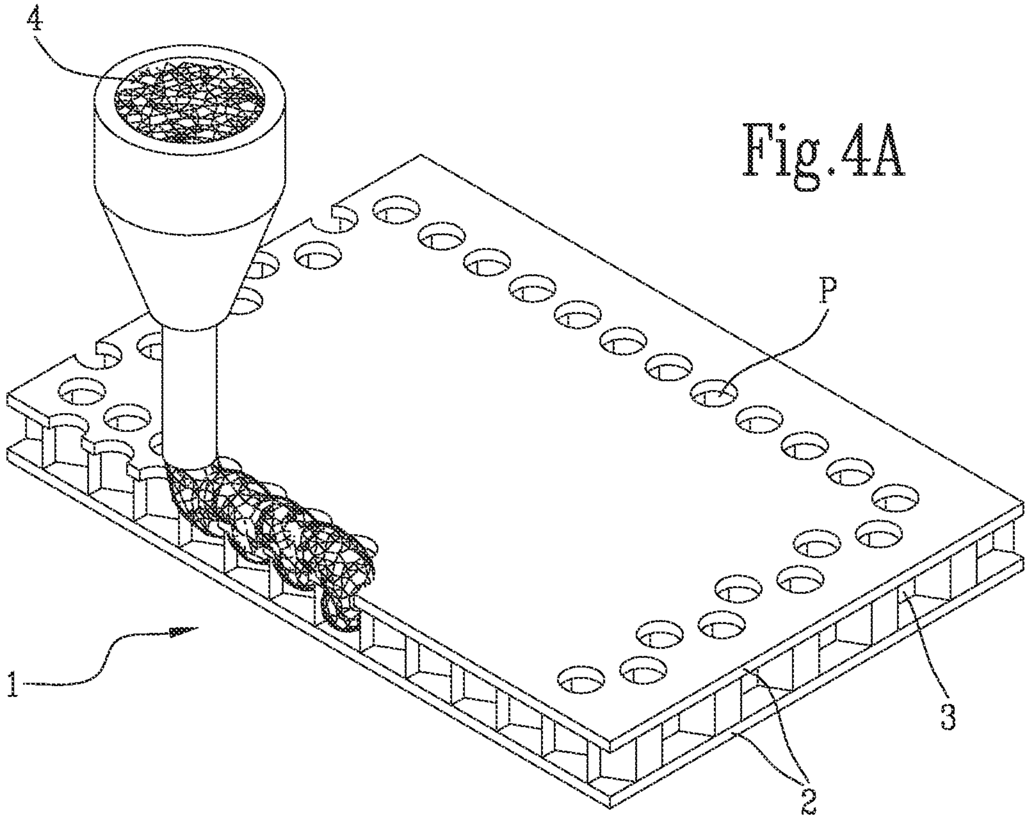
Fig.4A
Fig.4B
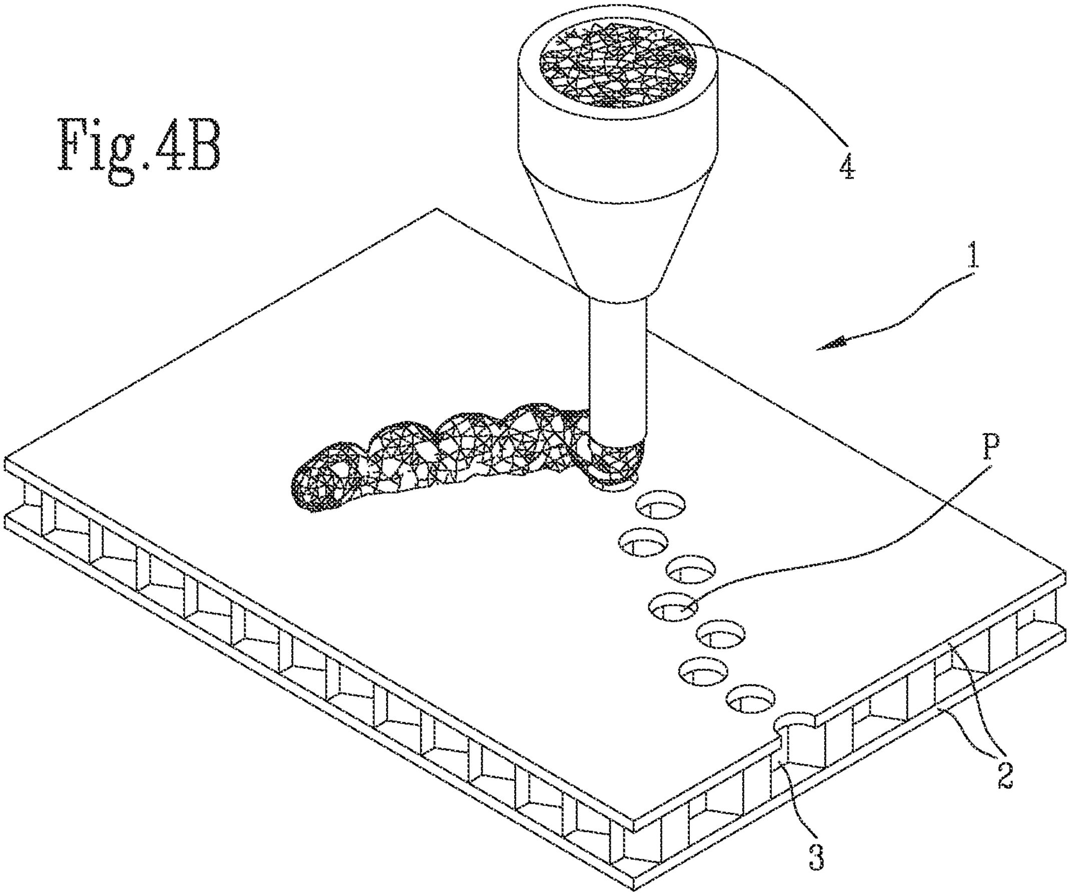

METHOD FOR PRODUCING OBJECTS

This application is the National Phase of International Application PCT/IB2022/054058 filed May 3, 2022 which designated the U.S.

This application claims priority to Italian Patent Application No. 102021000011732 filed May 7, 2021, which applications are incorporated by reference herein.

The present invention relates to the technical sector of production processes, in particular production processes involving or aimed at the manufacture of honeycomb panels and structures comprising the latter.

In particular, the present invention relates to a method for the production of objects, in particular objects comprising at least one honeycomb panel.

The honeycomb panels are particular panels that have a honeycomb structure enclosed between two plates and are usable in a great variety of sectors thanks to their peculiar conformation that makes them light and therefore easy to use and install, while at the same time being highly resistant (directionally) to impacts, cracks and loads.

These panels can be used to produce complex objects, such as structural elements and frames, in both the building and industrial fields, which are both light and strong thanks to the honeycomb structure.

Therefore, in view of the wide range of possible uses, there is a strong need in the industry for new production and processing processes that make it possible for the special properties, especially mechanical properties, conferred on such objects by their structural conformation, to be exploited to the full.

As is often the case with highly optimised materials, honeycomb panels offer outstanding properties in the intended field and manner of use. However, when stress/strain vectors are applied from different directions or at different intensities, these properties may be very quickly impaired. Aside from this, honeycomb panels do not offer anchorage points that run in the normal direction with respect to the plane unless they are grafted onto them; and if one were to decide to add such an accessory, problems would arise depending on the way one wished to anchor the additional element.

Bonding the element to the surface, for example, would be totally dependent on the shear or peel properties of the adhesive and would last within a narrow thermal range, outside of which, even for short periods, there would be a permanent loss of properties due to the misalignment of the components or the impairment of the adhesive properties.

Welding the element would thermally stress the inside of the sandwich, compromising the interface between the honeycomb and the plates containing it in a way that cannot be verified or quantified in a "predictive" manner.

By bolting, one would risk cutting off functional and crucial components, particularly in such an optimised element, within the panel.

In this context, the technical task underlying the present invention is to propose a method for producing objects that overcomes at least some of the drawbacks of the known art mentioned above.

In particular, a purpose of the present invention is to provide a method for the production of objects comprising particularly effective and efficient honeycomb panels able to simplify the manufacture and processing of such panels, while enhancing the advantages provided by their particular structural conformation.

The specified technical task and the specified purposes are substantially achieved by a method for the production of objects, comprising the technical characteristics set forth in one or more of the appended claims.

According to the present invention, a method is shown for the production of objects comprising at least one honeycomb panel.

The method is executed by providing at least one honeycomb panel.

Preferably, said honeycomb panel comprises a pair of plates and a honeycomb structure defined by a plurality of honeycombs, which structure is interposed between the plates.

The honeycomb panel is then engraved in such a way as to create a deposition path with a predetermined depth.

In particular, the honeycomb panel is engraved into at least one of its plates in such a way as to expose and make accessible a multiplicity of honeycombs adjacent to the deposition path.

In accordance with the invention, a useful volume is created for clinging and for generating a solid peel and shear resistant section within the panel itself as a result of the volume created by the interception of the groove excavated with the honeycomb cavities, in particular those cavities that will be undercut with respect to the top plate.

A filler material is applied along the deposition path in such a way as to fill at least partially the deposition path itself and the undercut areas created by the result of the concatenation between the excavated groove and the pre-existing cavity.

Specifically, the filler material is applied in such a way that it enters and preferably fills the multiplicity of honeycombs made accessible as a result of the honeycomb panel engraving operation.

Advantageously, application of the filler material is performed by means of an additive manufacturing (or over-moulding) process.

Preferably, application of the filler material is carried out in such a way as to achieve a portion of the object, that is, in such a manner that said filler material extends outside the deposition path defining a predefined structure.

In particular, the filler material is applied such that a predefined structure is defined extending outside the deposition path, preferably away from the deposition path.

Alternatively or additionally, the deposition path develops along at least an edge portion of the honeycomb panel.

Preferably, the method is performed by arranging at least two honeycomb panels and engraving at least a portion of respective edges of said honeycomb panels.

Again preferably, the method is performed by bringing the engraved edges of the honeycomb panels into abutment and applying the filler material across these edges in such a way as to connect and securely bind these honeycomb panels together.

Alternatively or additionally, the deposition path develops along at least one folding line of the honeycomb panel.

Preferably, the method is carried out in this context by folding the honeycomb panel around at least one folding line, as illustrated in FIGS. 6A and 6B, following the execution on the latter of the engraving, shown specifically in FIG. 5, which establishes its deposition path, straddling an engraving that determines its folding line.

Preferably, the filler material is applied along the deposition path in such a way as to assist the occurrence and subsequent maintenance of the folding of the honeycomb panel.

Advantageously, the method presented and described herein allows the particularly efficient manufacture of a wide range of products based on or comprising honeycomb panels.

The dependent claims, included here for reference, correspond to different embodiments of the invention.

Further characteristics and advantages of the present invention will become more apparent from the disclosure of an exemplary, but not exclusive, and therefore non-limiting preferred embodiment of a method for the production of objects, as illustrated in the appended Figures, wherein:

FIGS. 1A-11H show various possible methods of performing one of the steps of the method;

FIGS. 3A-3D and FIGS. 4A-4D show different possible methods of application of a filler material to a honeycomb panel;

FIGS. 5 and 6A-6B show the execution of some specific steps of the method in which a honeycomb panel is engraved and subsequently folded around the engraving path;

Figure 1A:
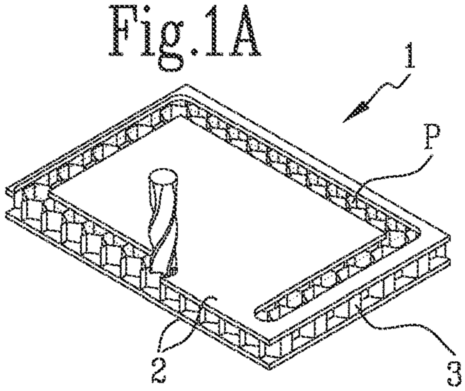
Figure 1B:
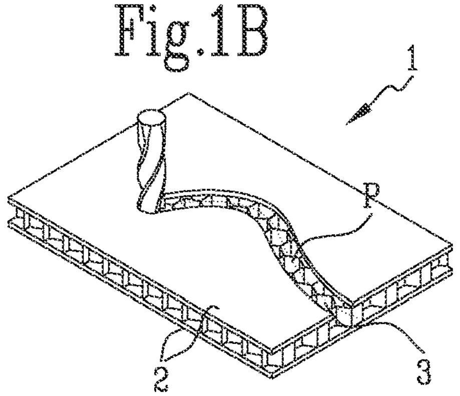
Figure 1C:
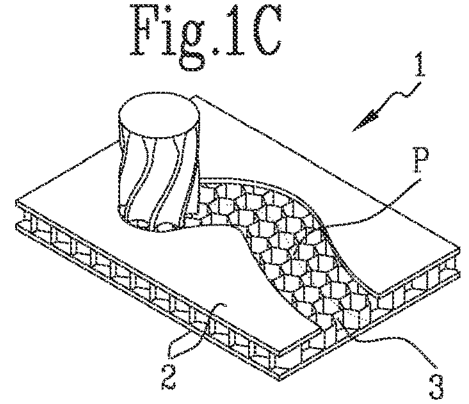
Figure 1D:
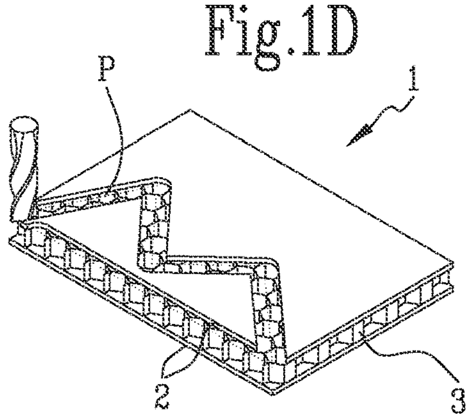
Figure 1E:
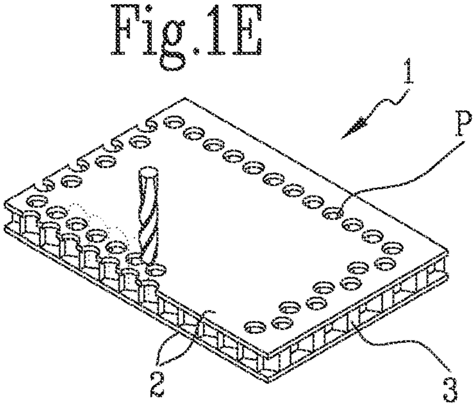
Figure 1F:
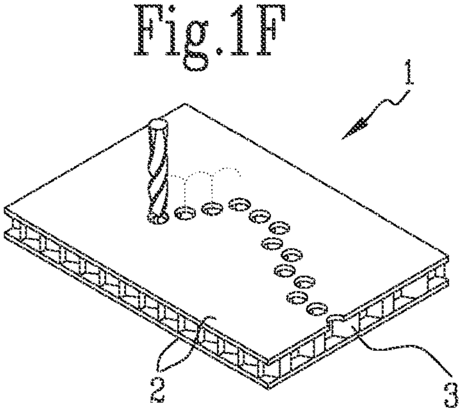
Figure 1G:
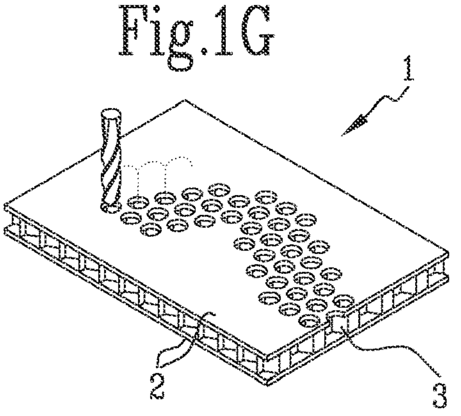
Figure 1H:
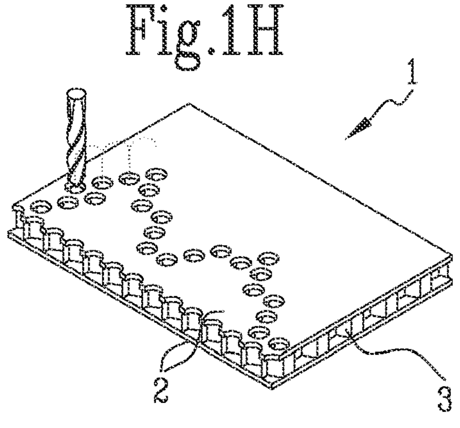
Figure 2A:
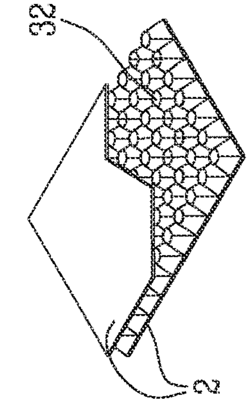
FIGS. 2A-2L show honeycomb panels with different internal structures.
Figure 2B:
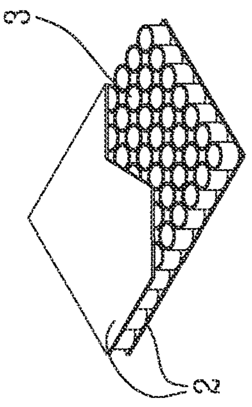
Figure 2C:
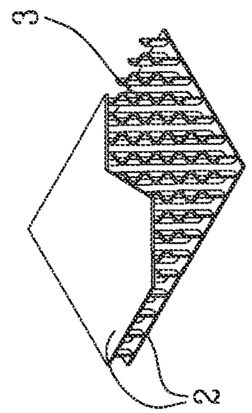
Figure 2D:
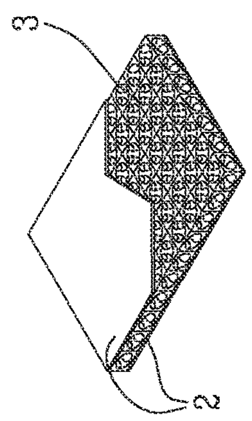
Figure 2E:
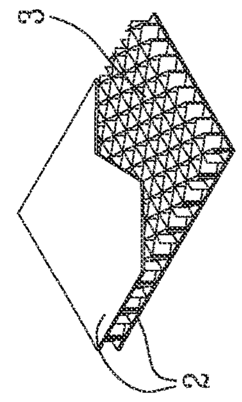
Figure 2F:
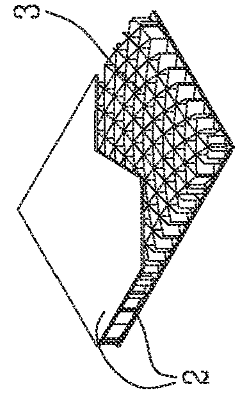
Figure 2G:
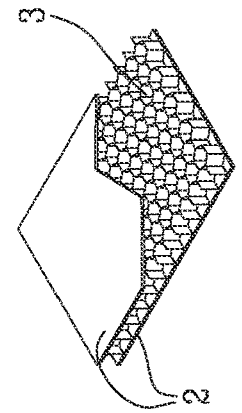
Figure 2H:
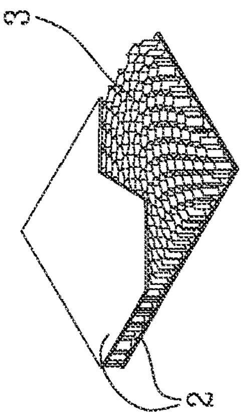
Figure 2I:
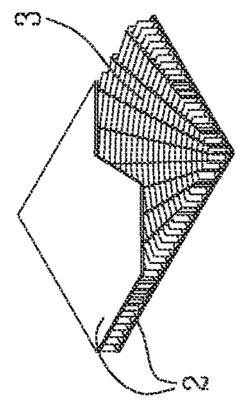
Figure 2J:
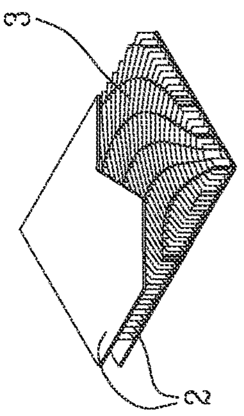
Figure 2K:
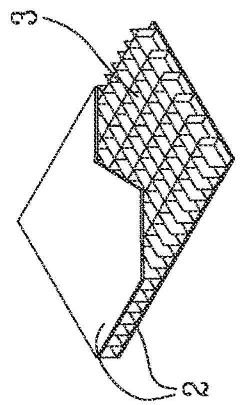
Figure 2L:
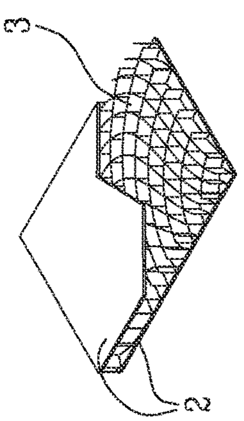
Figure 3A:
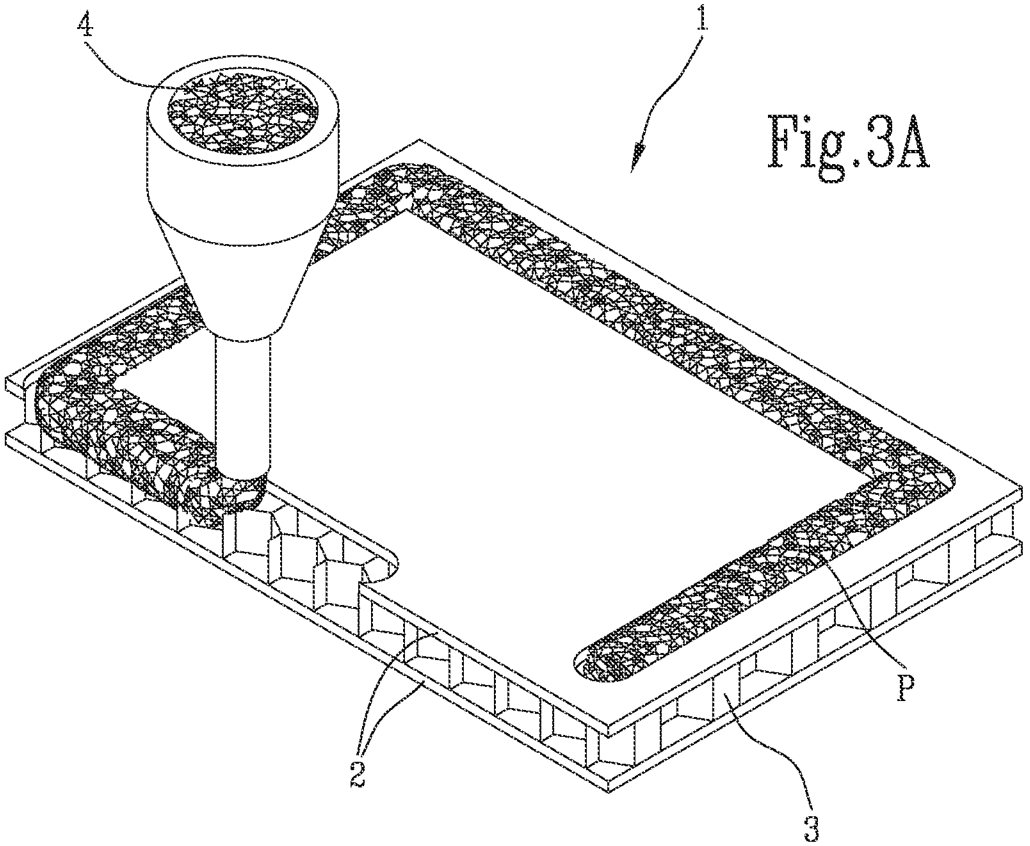
Figure 3B:
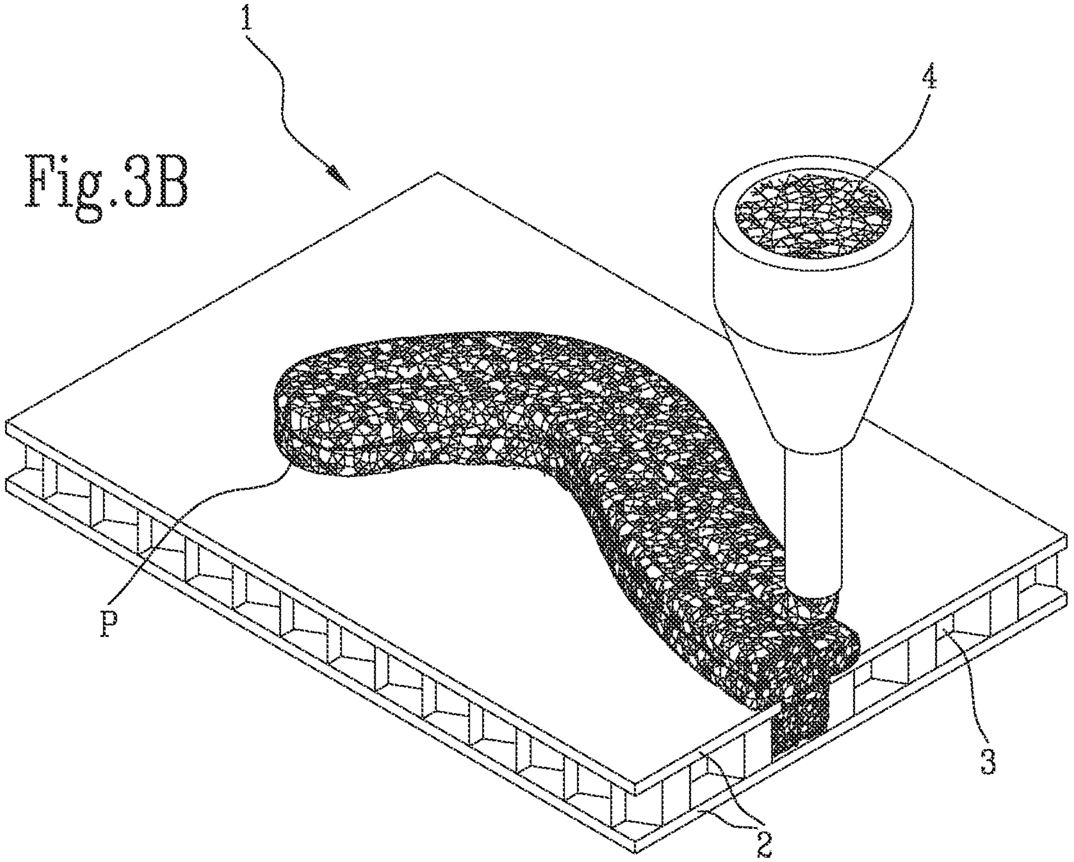
Figure 3C:
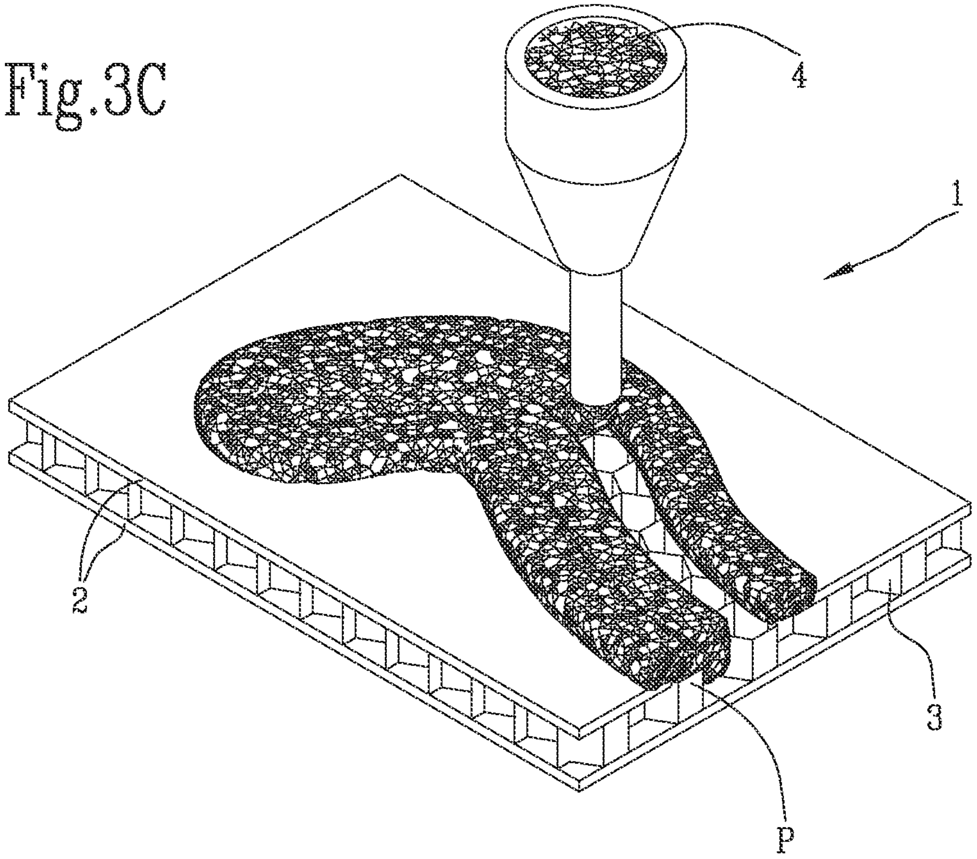
Figure 3D:
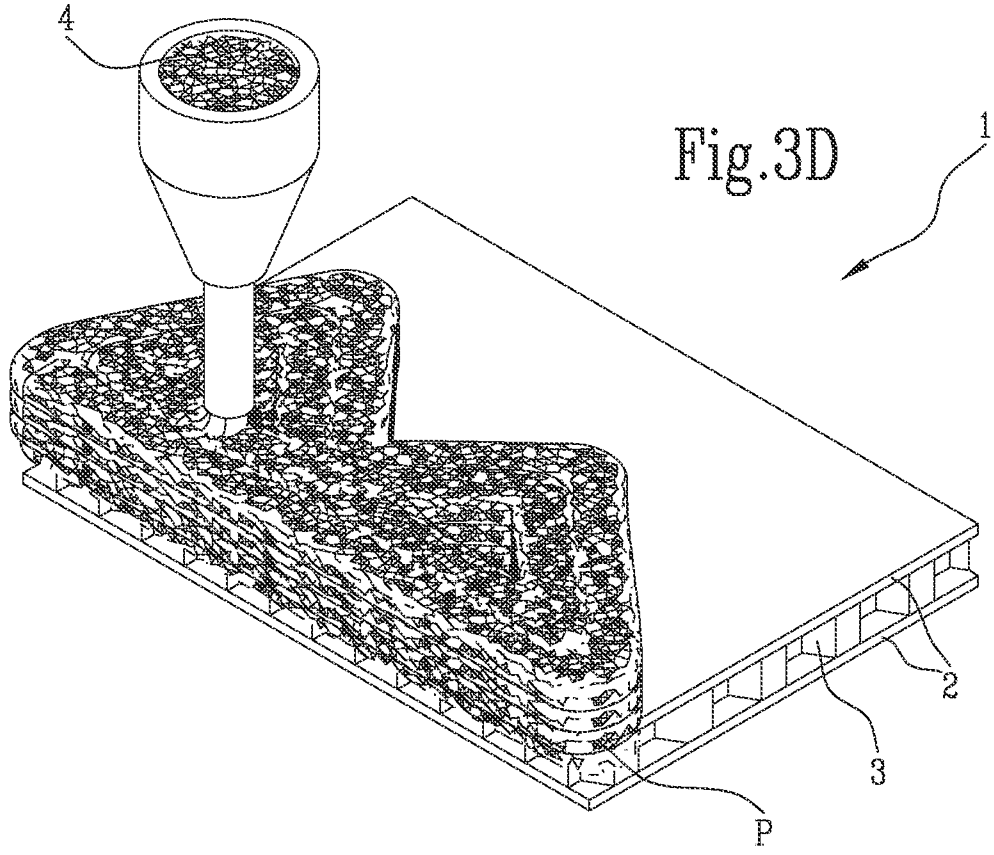
Figure 4C:
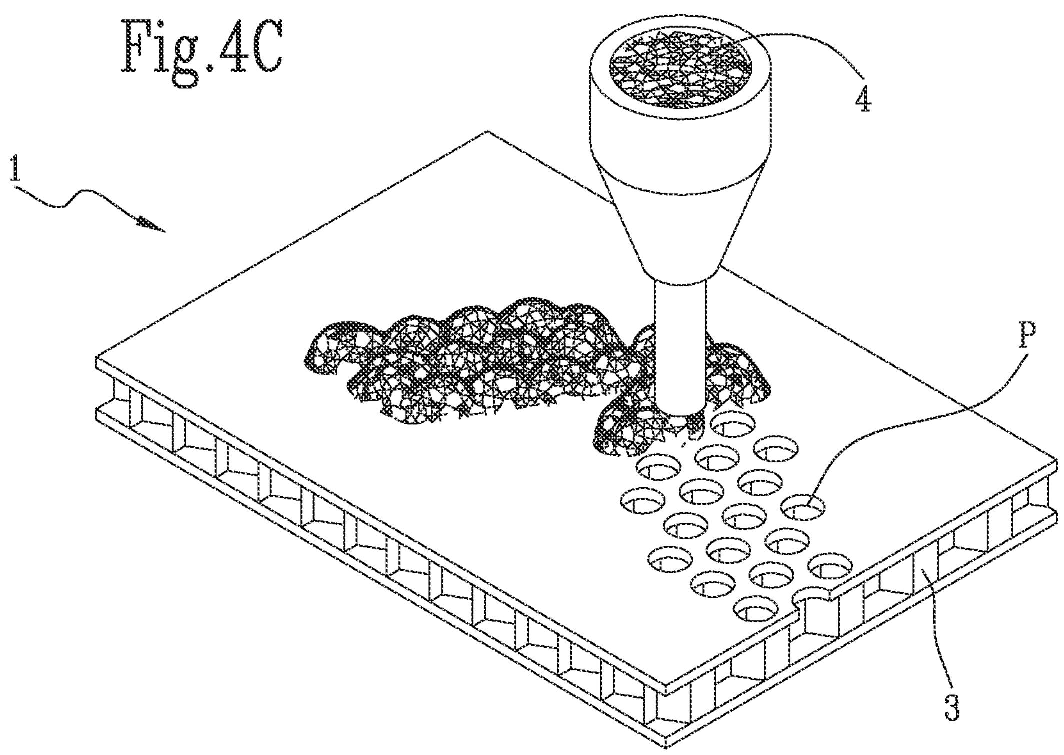
Figure 4D:
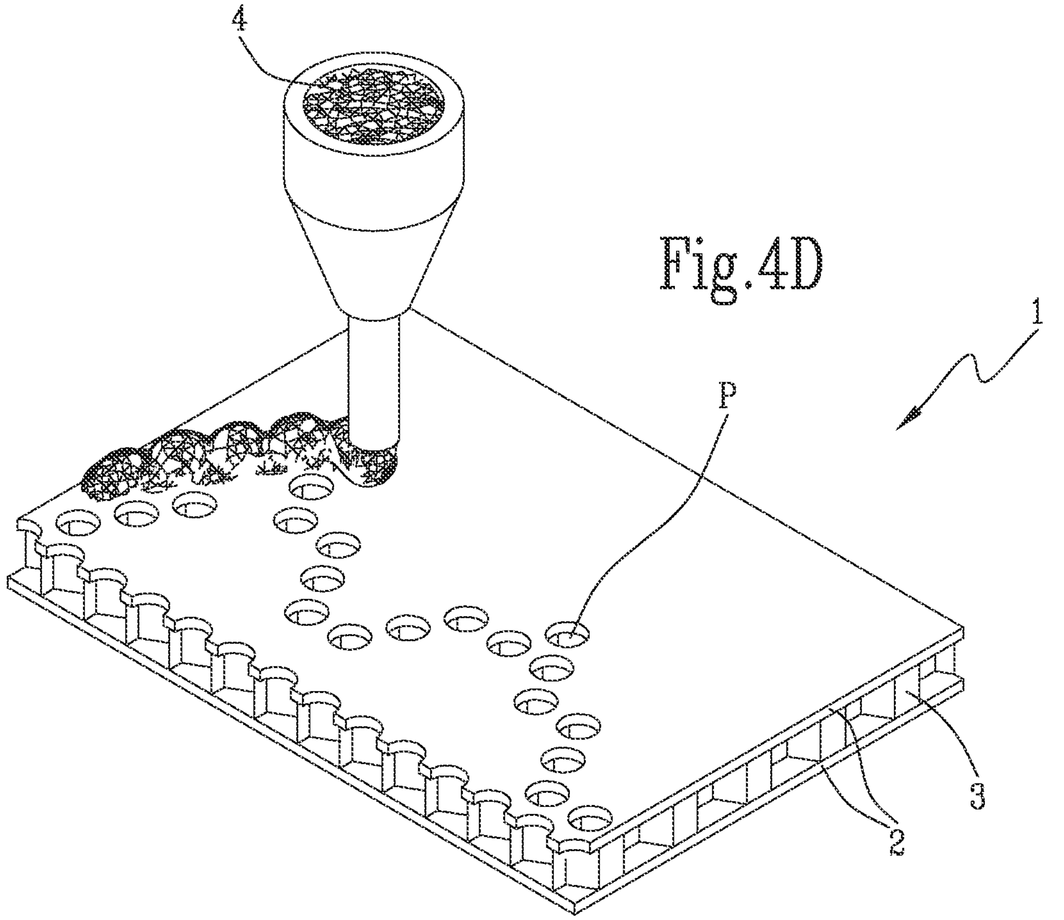
Figure 5:
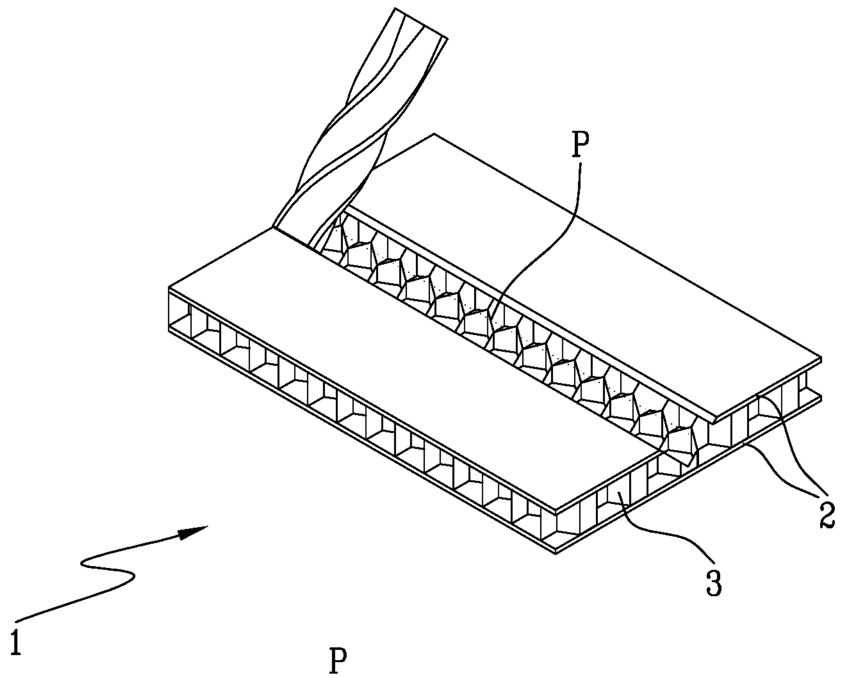
Figure 6A:
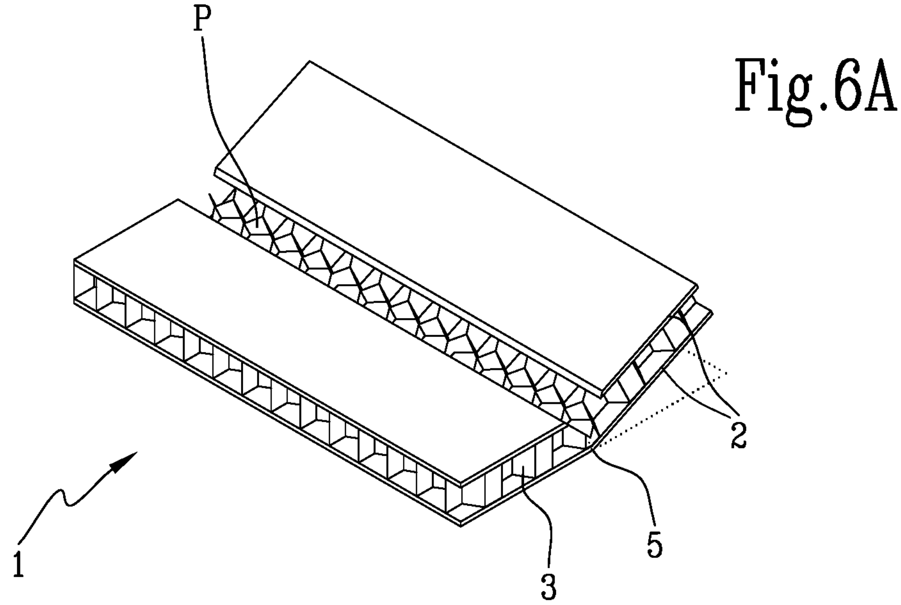
Figure 6B:
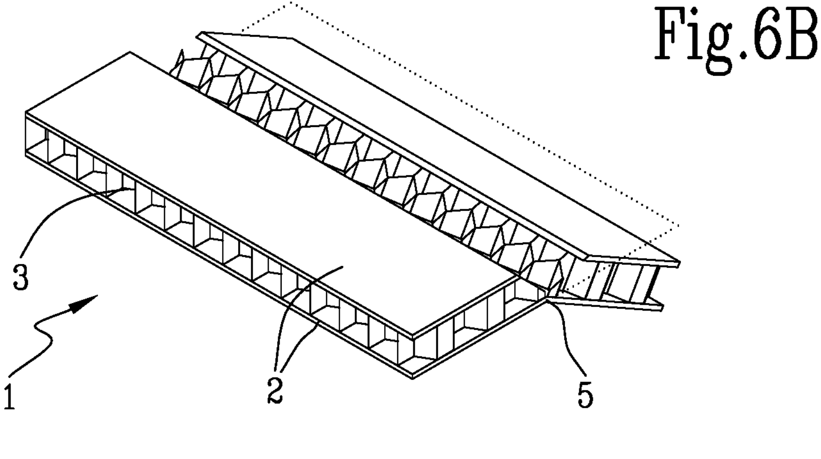
Figure 7A:
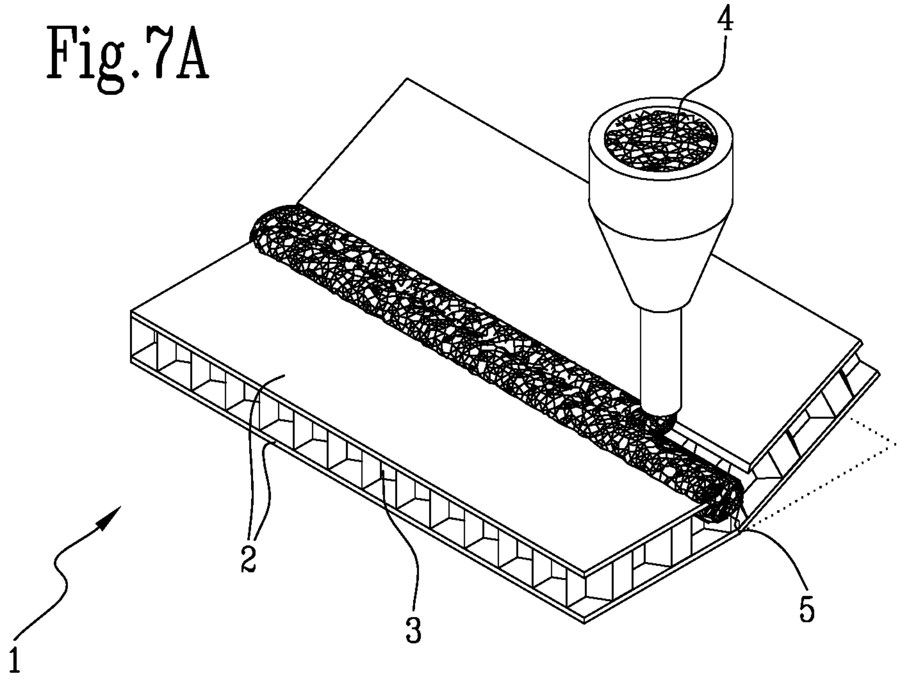
FIGS. 7A and 7B show the application of the filler material within the engraved path in the folded panels of FIGS. 6A and 6B, respectively.
Figure 7B:
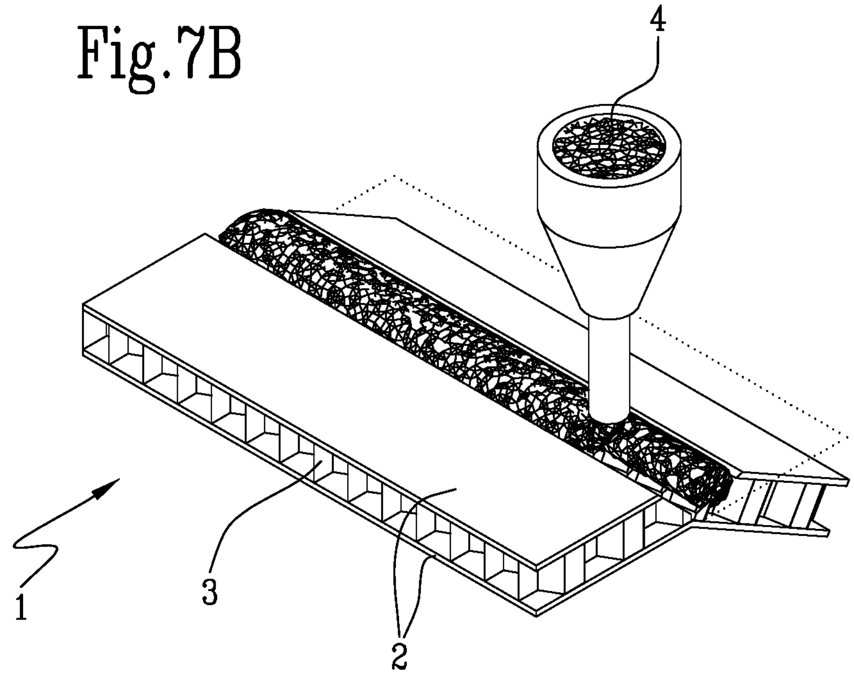

The method disclosed herein is intended for the production of objects comprising at least one honeycomb panel 1.

In other words, this method has the purpose of producing a semi-finished or finished product comprising at least one honeycomb panel 1, i.e. a panel internally presenting a structure defining a plurality of honeycombs.

Operationally, the method is performed by providing a honeycomb panel 1 comprising a pair of plates 2, between which an alveolar structure 3 defined by a plurality of honeycombs is interposed.

Said honeycomb panel 1 may comprise or be made using one or more of the following materials, by way of example only: glass, marble, aluminium (or at any rate any metal material or a metal alloy), aluminium-wood (or a combination of any metal or metal alloy with wood), polymers, composite materials, cement mixtures, resins or ceramic materials, and the plates 2 may have one or more surface finishes or coating surface layers that may be made, for example, from leather, wood, marble, metal or composite materials, textiles, non-woven fabrics, and the like, as required.

Structurally, the panel can be flat overall or have a predetermined radius of curvature.

In more detail, the panel may comprise at least one non-planar plate 2. This means that the two plates 2 between which the alveolar structure 3 is enclosed need not be parallel to each other.

Overall, the honeycomb panel can be curved, for example, with a curvature radius to thickness ratio of between 17:1 and 23:1.

Advantageously, the alveolar structure 3 may be made at least partially of an auxetic material, or it may feature a honeycomb geometry based on geometric shapes and/or cross-sectional profiling with auxetic characteristics.

Auxetic materials are particular in that they are characterised by a negative Poisson number, similar to what are known as "auxetic topologies", which are topologies for filling a volume that leave areas within the volume itself where the Poisson number of the stressed volume as a whole is negative. Materials and structures with a negative Poisson number expand transversally to the direction of stress when subjected to a tensile stress and tend instead to contract transversally to the direction of stress when compressed. At the same time, the "auxetic lattices" or, in any case, structures with an auxetic conformation, have a geometric reconfiguration behaviour, such that any mechanical stress applied to them aimed at obtaining a compression or dilation in one direction or orientation the other likewise implies a compression or dilation in the direction or orientation perpendicular to that of the application of the mechanical stress itself (as opposed to what occurs in an "isotropic" structure in which, instead of deformative geometric reconfigurations in opposite directions according to two orthogonal directions, a given stress in one direction or orientation determines equivocal deformative geometric reconfigurations in two directions perpendicular to each other).

In accordance with a peculiar aspect of the present invention, the arrangement of the honeycomb panel 1 is carried out by moulding at least the alveolar structure 3, preferably by means of an additive manufacturing process (or, if necessary, by overmoulding).

In other words, it is possible to prepare pre-existing plates 2, creating the alveolar structure 3 by moulding a suitable material, for example by selecting it from those listed above, by means of an additive manufacturing (or overmoulding) process.

More specifically, it is possible to prepare a first plate 2, which will act as the work surface for the additive manufacturing process, and then mould the material that defines the alveolar structure 3 onto it. Subsequently, it is possible to couple a second plate 2 to the alveolar structure 3, thus defining the honeycomb panel 1.

By way of example only, the alveolar structure 3 may have a plurality of spherical honeycombs, i.e. of spherical, semi-spherical or substantially spherical shape.

This means that the panel preparation process can be carried out in such a way as to produce a honeycomb panel 1 comprising an alveolar structure 3 having a plurality of spheroidal honeycombs.

Alternatively or additionally, the arrangement of the honeycomb panel 1 can also be performed by producing at least one plate 2 of the pair of plates 2, preferably both plates 2.

Advantageously, the production of the at least one plate 2 can also be performed by an additive manufacturing process.

In general, it therefore appears that the preparation of the honeycomb panel 1 can be carried out by producing and/or assembling one or more of its components, namely the plates 2 and the alveolar structure 3.

Regardless of the specific mode that leads to its preparation, the honeycomb panel 1 is engraved in such a way as to create a deposition path "P" that has a predetermined depth (as well as, from the point of view of the internal volumes of the panel, an "interception feature" of the cavities already existing in the panel itself).

The term "engraving" is intended to encompass any operation and process aimed at creating and defining a recess i.e. the deposition path "P", of predetermined depth in the honeycomb panel 1. In turn, the deposition path "P" achievable according to the invention may have any course with respect to the surfaces of the honeycomb panel 1, and develop into any geometric shape starting from any point of the panel and arriving at any other point of the panel (and defining, for example, open, closed, single or multi-branched paths, and so on, depending on the needs of the moment).

The depth of the deposition path "P" is understood as the distance between a base or bottom of the engraving and the surface of the plate 2 in which the engraving is made.

In accordance with a possible aspect of the present invention, the engraving step is at least partially performed by a milling process.

In other words, the deposition path "P" is achieved by milling a plate 2 and the alveolar structure 3 of the honeycomb panel 1 in such a way as to generate a removal of material up to a certain depth of the honeycomb panel 1 itself according to a precise predefined pattern.

This type of processing is particularly efficient in the event that the processing path develops along a linear section.

Alternatively or additionally, the engraving phase is performed at least partially by means of a drilling or boring process.

In other words, the deposition path "P" can be defined by one or more holes, not necessarily through-holes, made in the honeycomb panel 1 according to a precise predefined pattern.

This type of processing is particularly efficient if the deposition path "P" is defined by a plurality of substantially distinct and separate points.

Depending on the specific construction needs and the characteristics of the object to be made, it is also possible to engrave the honeycomb panel 1 in such a way as to define a deposition path "P" which includes a combination of linear and point-like sections by means of a combination of the possible types of processing discussed above.

More details on the "P" deposition path will be set out below.

The width of the groove and its depth in proportion to the distance between the plates (i.e. the thickness of the panel) depends on the viscosity of the deposited material, its resistance to shearing and the ability to adhere to the material of which the plates and honeycombs are composed.

Once the deposition path "P" has been defined, a filler material 4 can be applied to it. This can be a polymer or even something different, depending on the needs of the moment, in such a way as to fill it at least partially, preferably completely.

In other words, the groove created by engraving the honeycomb panel 1 defines a track along which the filler material 4 can be applied, inserted, deposited, moulded or extruded, which then fills the groove produced in the engraving phase.

In addition, the filler material 4 can be applied in such a way as to be bound to the honeycomb panel 1 at the deposition path "P" and define, beginning from this coupling zone, a more or less complex structure capable of defining a portion of the object.

Advantageously, the application of the filler material 4 is carried out by an additive manufacturing process.

Specifically, it is possible to perform an additive manufacturing process according to a first phase in which the filler material 4 is applied by creating a coupling portion, defined by the filler material 4 that is positioned within the deposition path "P", and a second phase in which the coupling portion operationally performs the basic function and work surface for the continuation of the additive manufacturing process in order to create a more or less complex predefined structure that preferably extends away from the honeycomb plate.

In this context, the honeycomb panel 1 actually defines a support base for the structure defined by the filler material 4.

By way of example only, all the steps described herein, and in general all the procedures presented herein that can be performed by additive manufacturing processes, can be achieved by means of a 3D moulding machine comprising an extrusion head through which the filler material 4 is processed and deposited on a work surface.

In greater detail, the extrusion head can be movable according to precise trajectories, in particular to follow the course of the deposition path "P".

Advantageously, the work surface may also be movable, for example it may be designated by a conveyor belt.

In this way, during the production of one or more of the honeycomb panel 1 components and/or during the application of the filler material 4 within the deposition path "P", the object being produced can be progressively moved away from the extrusion head, making it possible to produce indefinitely long items at least along a direction coinciding with the direction of the forward movement of the conveyor belt.

To facilitate the step of applying the filler material 4, the method is further performed by thermoregulating at least a portion of the honeycomb panel 1 while the filler material 4 is inserted into the deposition path "P".

For example, if the filler material 4 is or comprises a thermoplastic filler material 4, it is possible to heat the honeycomb panel 1, in particular the deposition path "P", at least at the section where said thermoplastic filler material 4 is being applied at any given time, and then to cool it in a controlled manner so as to determine the cooling gradient and consequently the level of final crystallinity and the resulting mechanical and, more generally, physico-chemical properties (if, on the other hand, the material is of the thermosetting type, the same volume or surface will be cooled and then heated in order to crosslink the deposited material).

Heating the honeycomb panel 1 assists the fluidisation of the thermoplastic filler 4 by facilitating its entry into the deposition path "P" and thus its correct coupling with the honeycomb panel 1.

Therefore, in general, the thermoregulation phase of the honeycomb panel 1 is performed with the aim of assisting the fluidisation of the filler material 4 in order to improve and facilitate its coupling to the honeycomb panel 1 while it is being applied in the deposition path "P".

It should be noted that, in general, a plurality of honeycombs of the alveolar structure 3 are exposed during the engraving phase, and therefore the application phase of the filler material 4 is in fact performed by applying it within these interconnecting volumes between the excavated groove and the honeycombs.

In other words, the engraving of the honeycomb panel 1 exposes one or more honeycombs of the alveolar structure 3 to the external environment, making it possible for the filler material 4 to enter them during the deposition phase of the filler material 4 itself.

Hence, in order to optimise the correct application of the filler material 4, including in order to ensure its correct coupling with the honeycomb panel 1, a length of time for application phase of the filler material 4 is determined as a function of the depth of the deposition path "P", preferably by setting a length of time proportionate to the depth of the deposition path "P", to its conformation, to the fluidity of the material and to its properties that determine its interaction with the surrounding surfaces.

In other words, in the case wherein the deposition path "P" can be considered superficial, i.e. it has a limited volume deriving from the concatenation between the volume of the honeycombs, the overall duration of the application process of the filling material 4 may be shorter because the amount of material to be applied and the volume of the deposition path "P" to be filled will be smaller, whereas for deposition paths “P” of greater depth or which have generated a greater volume in concatenation with the existing honeycombs, or if a greater solid volume is to be inserted in order to offer greater resistance of the volume introduced, it is advantageous to prolong the duration of the application process of filler material 4.

In particular, the amount of honeycombs exposed and accessible to the filler material 4 is directly proportional to the depth of the deposition path “P”, since, as the depth increases, the number of honeycombs made accessible along the side walls of the deposition path “P” will also increase proportionally, and it is therefore advantageous to prolong the duration of the filler material 4 application process enable the correct filling of the deposition path “P”.

In more detail, the engraving of the honeycomb panel 1 is performed so as to expose a plurality of honeycombs defining an undercut with a bottom wall of the deposition path “P”.

This means that the engraving makes accessible a plurality of honeycombs, among which at least one (preferably all) facilitates the entry of the filler material 4 by means of a through-hole which has a smaller surface area than the corresponding inner surface area of the chamber defined by the honeycomb and at which said through-hole is defined.

In this way, when the filler material 4 is applied in the deposition path “P” and enters the exposed honeycombs, it will cling to the undercut, making the coupling between the honeycomb panel 1 and the filler material 4 particularly resistant to tensile stresses.

This aspect is particularly relevant if the object to be produced is, comprises or contributes to defining a frame or a structural element that must withstand this type of stress.

Advantageously, the specific conformation of the deposition path “P” can be defined as a function of the purpose for which this method is performed, or as a function of the structural characteristics of the object to be produced.

In particular, according to a first aspect, the deposition path “P” can develop along the honeycomb panel 1, in such a way as to follow, at least in part, an edge thereof.

This specific conformation of the deposition path “P” is particularly useful for obtaining objects the production of which requires the coupling of several honeycomb panels 1.

In fact, it is possible to engrave several honeycomb panels 1 at their respective edges, bring them into abutment and apply filler material 4 straddling their respective deposition paths “P” in such a way as to allow them to couple with both panels and in fact perform the function of a portion/coupling element between the two panels 1, binding them firmly together.

In particular, the method can be carried out by preparing, according to any of the methods set out above, at least two honeycomb panels 1 subsequently engraving respective portions of the edge that will be brought into abutment.

It is possible to engrave the panels separately and then proceed only at a later stage to assemble them by bringing them into abutment, or it is possible to bring them into abutment in such a way that the deposition path “P” can be achieved by means of a single engraving step performed by straddling the abutted edges of the honeycomb panels 1.

The filler material 4 is then applied in the manner described above in such a way as to connect the honeycomb panels 1 at the edge portions that have been engraved in order to join them firmly together.

Alternatively or additionally, in accordance with a further aspect, the deposition path “P” develops along at least one folding line 5 and the method is further executed by folding the panel around the at least one folding line 5 before application of the filler material 4.

In other words, the honeycomb panel 1 is engraved along said folding line 5 and folded around it, in particular by exerting a force directed in such a way as to widen the deposition path “P”.

Once the desired shape has been obtained, the filler material 4 can be applied.

In this way, the filler material 4 contributes to the maintenance of the conformation assumed by the honeycomb panel 1, since its presence prevents the latter from reverting to the deformation applied.

Advantageously, the present invention achieves its proposed purposes by overcoming the drawbacks associated with the known technique by making available to the user a method for the production of objects comprising at least one honeycomb panel 1 which allows complex structures to be produced by, for example, deforming and/or coupling honeycomb panels 1, or by producing predefined structures on said honeycomb panels 1, in particular by exploiting the peculiarities and advantages provided by additive manufacturing processes (or, as already mentioned several times above, by the possible use of overmoulding processes).

The invention claimed is:

1. A method for producing objects comprising at least one honeycomb panel, said method comprising the steps of:

providing at least one honeycomb panel comprising a pair of plates and a honeycomb structure interposed between said plates;

engraving said at least one honeycomb panel to create a deposition path having a predetermined depth;

applying, by an additive manufacturing process, a filler material along said deposition path to at least partially fill said deposition path;

thermoregulating at least one portion of the at least one honeycomb panel during the step of applying the filler material.

2. The method according to claim 1, wherein a time duration of the step of applying the filler material is determined as a function of the depth of the deposition path, said time duration being proportional to the depth of the deposition path.

3. The method according to claim 1, wherein said engraving step is performed at least partially by a milling or laser cutting or water cutting or plasma cutting process.

4. The method according to claim 1, wherein the engraving step is performed to make the deposition path at least partially follow an edge of the at least one honeycomb panel.

5. The method according to claim 1, wherein the engraving step is performed to make the deposition path extend along at least one folding line and the method comprises a step of folding the at least one honeycomb panel around said at least one folding line; said step of folding being performed between the engraving step and the step of applying the filler material.

6. The method according to claim 1, wherein the step of providing the at least one honeycomb panel is performed by providing that the at least one honeycomb panel is made at least partially with an auxetic material and/or has a honeycomb geometry based on geometric shapes and/or section profiles having auxetic features and/or topologies.

7. The method according to claim 1, wherein the step of providing the at least one honeycomb panel is performed by providing that the pair of plates comprises at least one non-planar plate.

8. The method according to claim 1, wherein said at least one honeycomb panel is non-planar and has a radius of curvature and thickness ratio between 17:1 and 23:1.

9. The method according to claim 1, wherein the step of engraving the at least one honeycomb panel is performed to expose a plurality of honeycombs of said honeycomb structure, to allow entry of the filler material into said plurality of honeycombs during the step of applying the filler material.

10. The method according to claim 9, wherein the engraving step is performed to expose the plurality of honeycombs defining an undercut with a bottom wall of the deposition path.

11. The method according to claim 1, wherein the step of providing the honeycomb panel is performed by providing the pair of plates and producing, by an additive manufacturing process, the honeycomb structure to be interposed between said plates.

12. The method according to claim 11, wherein the step of producing the honeycomb structure is performed by producing an alveolar structure having a plurality of spheroidal honeycombs.

13. The method according to claim 1, wherein the step of providing the at least one honeycomb panel is performed by producing, by an additive manufacturing process, at least one plate of said pair of plates.

14. The method according to claim 1, and further comprising the steps of:

wherein the step of providing at least one honeycomb panel includes providing at least two honeycomb panels;

lining up said at least two honeycomb panels at respective edge portions;

engraving said at least two honeycomb panels to create the deposition paths extending at least partially along said edge portions;

applying the filler material to connect the at least two honeycomb panels at the edge portions.

15. The method according to claim 1, wherein the step of applying the filler material is performed by applying the filler material to define a predefined structure extending outside the deposition path, away from said deposition path.

16. A method for producing objects comprising at least one honeycomb panel, said method comprising the steps of:

providing at least one honeycomb panel comprising a pair of plates and a honeycomb structure interposed between said plates;

engraving said at least one honeycomb panel to create a deposition path having a predetermined depth;

applying, by an additive manufacturing process, a filler material along said deposition path to at least partially fill said deposition path; and wherein the step of providing the at least one honeycomb panel is performed by providing that the at least one honeycomb panel is made at least partially with an auxetic material and/or has a honeycomb geometry based on geometric shapes and/or section profiles having auxetic features and/or topologies.

17. A method for producing objects comprising at least one honeycomb panel, said method comprising the steps of:

providing at least one honeycomb panel comprising a pair of plates and a honeycomb structure interposed between said plates;

engraving said at least one honeycomb panel to create a deposition path having a predetermined depth;

applying, by an additive manufacturing process, a filler material along said deposition path to at least partially fill said deposition path;

wherein the step of providing the honeycomb panel is performed by providing the pair of plates and producing, by an additive manufacturing process, the honeycomb structure to be interposed between said plates; and wherein the step of producing the honeycomb structure is performed by producing an alveolar structure having a plurality of spheroidal honeycombs.

* * * * *